LIQUID FILTER AND CHIP DETECTOR

Filed Oct. 16, 1964 2 Sheets-Sheet 1

INVENTOR.
DIETRICH W. BOTSTIBER
BY
Albert Sperry
ATTORNEY

INVENTOR.
DIETRICH W. BOTSTIBER
BY
Albert Sperry,
ATTORNEY

United States Patent Office 3,317,042

Patented May 2, 1967

3,317,042

LIQUID FILTER AND CHIP DETECTOR

Dietrich W. Botstiber, 307 S. Chester Pike, Glenolden, Pa. 19036

Filed Oct. 16, 1964, Ser. No. 404,244
8 Claims. (Cl. 210—86)

This invention relates to filters adapted for use in lubricant systems and elsewhere to remove electrically conducting and other particles of foreign matter from a circulating liquid. The invention is directed particularly to constructions which include means for actuating an electrical signalling or control circuit when a predetermined accumulation of electrically conducting foreign matter has been removed from the liquid being filtered.

Various types of filtering devices have been produced heretofore for removing foreign particles from lubricants or other liquids. In some instances, such systems have also included "chip detectors" in the form of spaced electrical contacts which serve to complete a signalling circuit when sufficient electrically conducting particles accumulate thereon to bridge the contacts. However, the chip detecting means are frequently located in a sump or at a point remote from the filtering element and therefore do not necessarily remove all ferro-magnetic or any non-magnetic particles from the liquid. On the other hand, those constructions heretofore provided wherein filtering and chip detecting means have been combined have been relatively complicated and have not been operable to actuate an electrical circuit or signal until a relatively large amount of metallic particles have been removed from the liquid.

In accordance with the present invention, these objections and limitations inherent in liquid filtering means of the prior art are overcome, and simple, inexpensive devices are provided which are highly effective in both their filtering and chip detecting action. These advantages are preferably attained by providing filtering means which are inclined with respect to the direction in which the liquid flows through the device and by locating spaced electrical contacts at the lower or far end of the filtering element. In this way, particles of foreign matter removed from the liquid are washed or otherwise caused to move across the filtering means toward the chip detecting elements so as to be concentrated adjacent to the contact elements. As a result, the chip detector is rendered more sensitive in that it is not necessary for metallic particles to build up over an extended area of the filter, and concentration of all metallic particles adjacent the contact elements of the chip detector will occur, whether the particles are ferro-magnetic or not.

Accordingly, the principal objects of the present invention are to assure the effective filtering of circulating liquids, to increase the sensitivity of chip detecting means used in liquid circulating systems, and to provide simple and improved means for use in filtering circulating liquids and indicating the presence of metallic material removed from such liquids.

These and other objects and features of the present invention will appear from the following description thereof wherein reference is made to the figures of the accompanying drawings.

Figure 1:
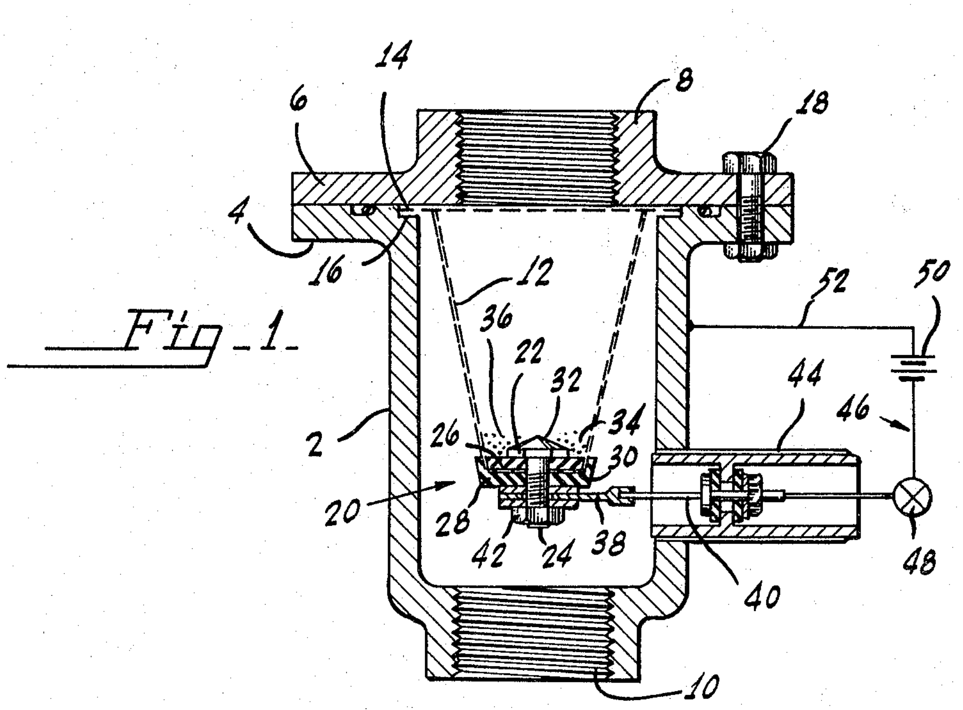
FIG. 1 is a longitudinal sectional view through a typical form of filter and indicating device embodying the present invention.

In that form of the invention chosen for purposes of illustration in FIG. 1, the filter device is provided with a metallic casing 2 having a flange 4 at one end thereof for attachment to a flange 6 of a fitting 8 through which the lubricant or other liquid to be filtered is circulated. The opposite end of the casing 2 is provided with a threaded outlet connection 10 by means of which the device can be attached at a convenient point to the conduits or lines through which the liquid is passed.

The filter element employed as shown in FIG. 1 is in the form of a conical metallic screen 12 having a flange 14 located adjacent the upper or inlet end of the casing 2 in position to engage a shoulder 16 in the casing and to be held in place by the bolts 18 and the flange 4 of casing 2 and flange 6 and fitting 8. The apex of the conical screen 12 is thereby positioned centrally within the casing 2 and substantially on the center line of flow of liquid from the inlet to the outlet end of the casing 2.

The apex of the filter cone 12 is provided with chip detecting means indicated generally at 20. As shown in FIG. 1, the chip detector embodies a central metallic stud 22 having a shank 24 which extends through insulating washers 26 and 28 embracing the lower inturned extremities 30 at the apex of the conical filter element 12. The head 32 of the stud 22 bears against the washer 26 on the interior of the filter cone and is spaced a short distance from the cone so as to provide a contact gap 34 which may be bridged by the particles 36 of foreign matter removed from the liquid by the screen 12. The lower end of the shank 24 of the stud 22 is electrically connected to the terminal 38 of a conductor 40 and is threaded to receive a clamping nut 42. The lower washer 28 on the exterior of the conical filter screen 12 thus serves to insulate the terminal 38 of conductor 40 from the metallic screen.

Conductor 40 extends to the exterior of the casing 2 through a plug 44 or the like and forms part of a signalling or other electrical circuit 46. A lamp, signal or other electrically actuated means 48 and a source of current 50 are included in the circuit 46 whereas a conductor 52 is electrically connected to the casing 2 and metallic filter screen 12.

With this construction, the liquid to be filtered enters the casing 2 through the fitting 8 and flows axially through the conical, metallic filter screen 12 to the outlet connection 10 of the casing. In this way, all of the liquid circulated through a lubricating system or the like can be effectively filtered to remove foreign particles therefrom without imposing excessive back pressure thereon. At the same time, the inclined surfaces of the filter element cause the particles of foreign matter to pass downward over the surface of the filter cone toward the apex thereof where the chip detector is located. As a result, the upper or base portion of the filter cone is washed free of foreign particles so as to remain effective for filtering purposes whereas the particles removed from the liquid are caused to be concentrated in that portion of the screen adjacent the chip detector. If these particles or a sufficient portion thereof are metallic or of an electrically conducting character, they will serve to bridge the gap 34 between the head 32 of stud 22 and the metallic screen 12 so as to complete the electrical circuit 46 and actuate the signal device 48. The movement of the particles of material into the gap 34 to complete the signalling circuit and the concentration and compacting thereof into this restricted area to provide an electrically conducting bridge, occurs automatically and of necessity as an incident to the flow of the liquid downward or across the inner surface of the screen 12 toward the apex of the cone. Therefore, accumulation of sufficient conducting material to actuate the signalling circuit occurs more rapidly than would be the case if the foreign matter was distributed over a flat surface or the entire area or even a major portion of the screen. Accordingly, the chip detector is rendered more sensitive than would otherwise be the case, and the signal will be actuated before the filter screen has become so clogged as to present a hazardous condition.

If desired, the insulating washer 26 of the construction shown in FIG. 1 may be formed of a magnetic type of ceramic material which will serve to attract and concentrate ferro-magnetic particles in much the same manner as in the chip detector of applicant's issued Patent No. 2,936,890. In this way, the formation of an electrically conducting bridge of ferro-magnetic particles in the gap 34 of the chip detector can be accelerated and the device rendered even more responsive for actuating the signalling circuit.

The construction shown in FIG. 1 and described above can be readily connected into existing lubricant or other liquid circulating systems. While it may be located in any portion of the liquid circuit, it is preferably arranged in a vertical position so that the liquid will flow downward through the casing 2 and accumulation and retention of the particles of foreign matter adjacent the apex of the conical screen 12 will be aided by the action of gravity.

Figure 2:
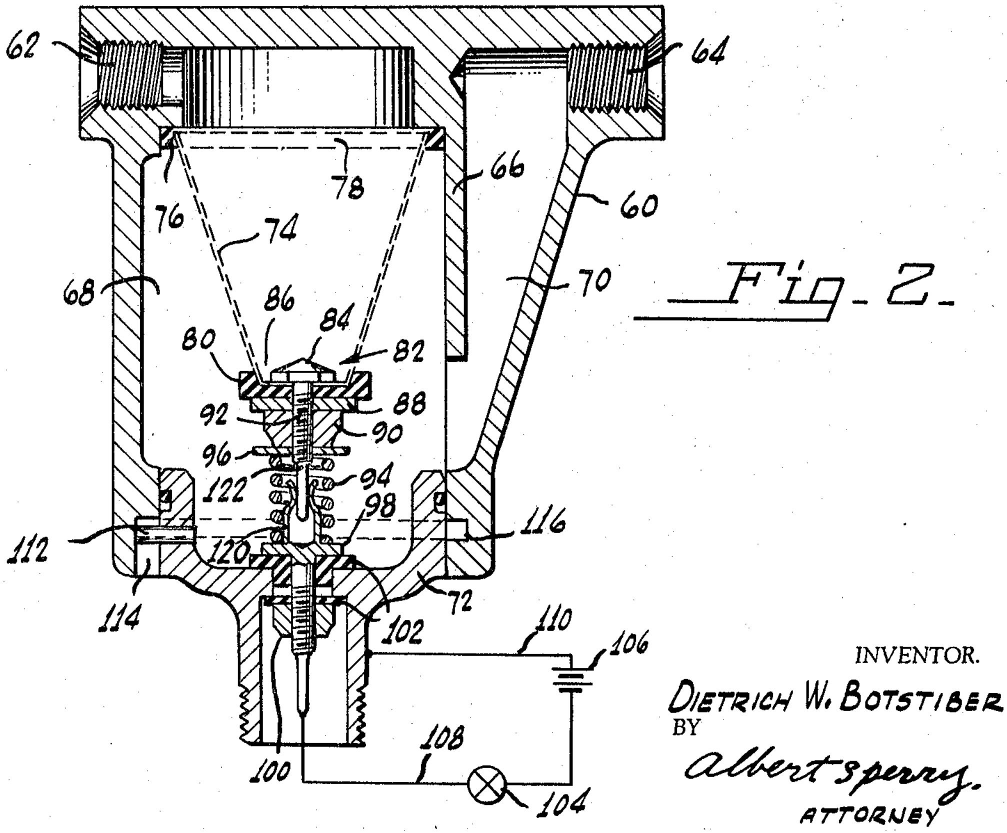
FIG. 2 is a sectional view through an alternative construction embodying the present invention.

In the alternative, and when devices embodying the present invention are to be located in a horizontal portion of a liquid circulating system, constructions such as that of FIG. 2 may be employed. As there shown, the device is provided with a casing 60 having a horizontally directed inlet port 62 and a horizontally directed outlet port 64. A vertically extending barrier 66 serves to divide the interior of the casing into a filtering chamber 68 and an outlet duct 70. The lower end of the casing 60 is provided with a closure plate 72 which may be removably connected to the casing to permit insertion and removal of a conical filter element 74 formed of metallic material.

In the construction shown in FIG. 2, the upper end of the conical filter has a positioning collar 76 thereon for locating the larger upper end of the filter cone in registry with an inlet opening 78 communicating with inlet port 62. The lower apex end of the conical filter screen 74 is held in place by an insulating cup 80 through which a metallic stud 82 extends. The upper end of stud 82 has a head 84 which cooperates with the lower portion of the screen 74 to form a gap 86 which may be bridged by particles of foreign matter filtered from liquid flowing through the screen from the inlet port 62 to the outlet port 64. A washer 88 is positioned below the cup 80 and held in place by a nut 90 threaded onto the shank 92 of the stud 82. The cup 80 and stud 82 are urged upward toward the apex of the conical screen 74 by means of a coiled spring member 94 which bears against a plate 96 surrounding the shank 92 of the stud 82. The lower end of the spring 94 bears against a shoulder on a member 98 which is secured to the closure plate 72 by a nut 100 and insulated from the closure plate by the washers 102.

The lower end of the member 98 is designed to be electrically connected to a signal device 104 and a source of current 106 by means of a conductor 108 whereas the conductor 110 is connected to the closure plate 72 and through casing 60 is connected to the screen 74 for providing a circuit which may be closed and actuated upon the bridging of the gap 86 between the screen and the head 84 of stud 82 by an accumulation of conducting material in the gap 86.

With this construction, the action of the filtering and chip detecting means is essentially the same as that described above in connection with that form of the invention illustrated in FIG. 1. However, the closure plate 72 can be readily removed to remove the filter screen 74 and chip detector for cleaning or removal without disconnecting the casing 60 from the system. Further as shown in FIG. 2, the closure plate 72 may be provided with a radially projecting pin 112 adapted to enter a slot 114 in the lower edge of the casing 60 as shown in FIG. 2 so as to be rotated along a circumferential groove 116 in the casing to a position wherein it will lock the closure plate 72 in place. When thus positioned, the spring 94 will serve to urge the cup 80 and conical filtering member upward into place to hold the parts in their assembled relation. Moreover, the member 98 carried by the closure plate 72 may be provided with a tubular extension 120 which surrounds and engages the lower end 122 of the shank 92 of stud 82 so as to center and assure proper location of the elements during the operation of assembling or disassembling the parts and maintain the electrical circuit established therethrough.

Figures 3, 4, 5:
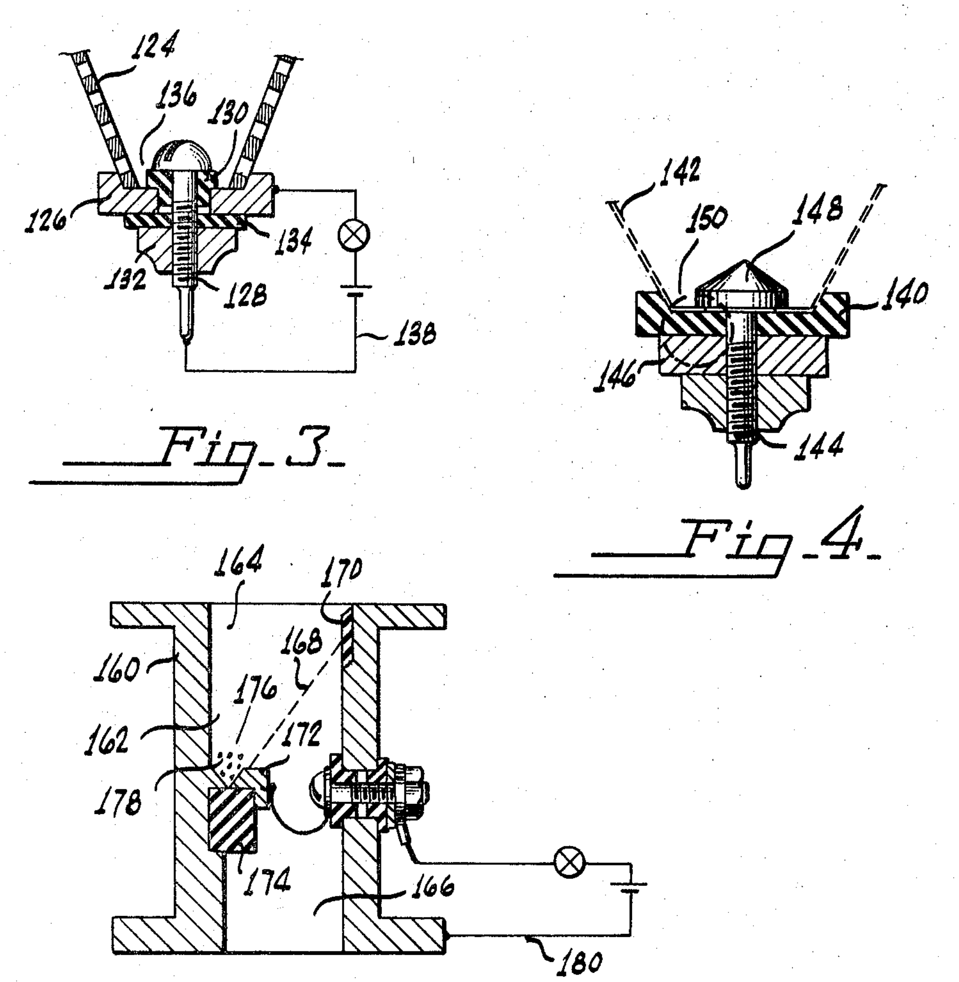
FIGS. 3 and 4 are sectional views through portions of alternative devices embodying the present invention.
FIG. 5 is a sectional view through a further alternative embodiment of the present invention.

In either of the forms of the invention described above, it is possible to vary the form and construction of the elements of the assembly. Thus as shown in FIG. 3, the conical filter screen 124 may be formed of non-metallic or non-conducting material and the lower edge of the screen may be held in place by a metallic cup 126. The stud 128 may then be mounted in the cup 126 but insulated therefrom by an insulating grommet 130. A nut 132 engaging the shank of the stud is then insulated from the cup 126 by an insulating washer 134 and serves to secure the elements in place so as to establish a gap 136 which may be bridged by electrically conducting particles filtered from the liquid by the non-metallic screen 124. A signalling circuit 138 may then be provided by connecting the cup 126 and the stud 128 to a signal device and source of current as desired.

In the further alternative construction shown in FIG. 4, the cup 140 located at the apex of a conical filtering element 142 may be formed of electrical insulating material. The screen element 142 may be formed of metal and insulated from a ferro-magnetic stud 144 by the insulating cup 140. An Alnico or other magnetic disc 146 may be secured in place beneath the cup 140 and in engagement with the stud to provide a magnetic circuit including the head 148 of the stud 144 to aid in concentrating any particles of ferromagnetic material in the gap 150 between the stud and screen for actuating a signalling circuit.

Figure 6:
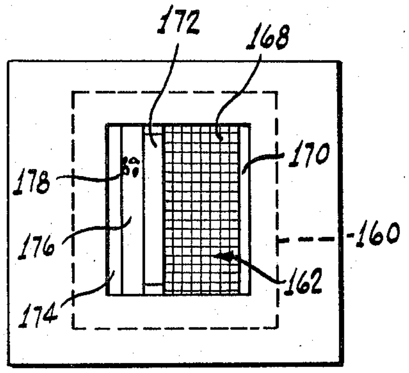
FIG. 6 is a plan view of the construction shown in FIG. 5.

In each of the forms of the invention described above, it is indicated that the filter screen employed should have a conical form. However, as shown in FIGS. 5 and 6, the filter employed may be of a flat planar form if desired. Thus, the casing 160 may be square or rectangular in cross-section to provide a chamber 162 having an inlet 164 and an outlet 166. The filter element 168 employed is then in the form of a rectangular non-conducting screen positioned within the casing at an angle inclined with respect to the direction of flow of liquid through the chamber from the inlet to the outlet thereof. The upper edge of the screen 168 is held in place by a frame member 170, whereas the lower edge of the screen has a conducting frame member 172 which is spaced from the walls of the chamber by an insulating element 174. An electrical gap 176 is thus presented between the lower frame member 172 and the casing 160 which may be bridged by electrically conducting particles or chips 178 washed down toward the lower edge of the screen by the liquid being filtered. Suitable electrical connections may then be provided between the casing and lower edge frame member 172 to actuate a signalling circuit 180 when the circuit is completed.

In each of the forms of the invention described, the chip detector presents spaced elements which are located on the inlet side of an inclined filter screen and adjacent the portion of the screen farthest removed from the inlet or toward which the liquid is directed in passing through the filter. In this way, all of the particles removed from the liquid by the filter are caused to move toward the gap between the spaced elements to bridge the gap and complete a signalling circuit. Of course, all of the particles filtered from the liquid may not be of an electrically conducting type, and a substantial accumulation of particles may build up before the signal circuit is actuated. At other times, a single large chip or conducting particle may bridge the gap and actuate the signal while the filter is still relatively clean. Nevertheless, the action of the device in utilizing the flow of liquid therethrough for the purpose of concentrating or directing the foreign particles toward the spaced elements of the chip detector serves to render the device more sensitive and reliable in operation than constructions heretofore available and yet such devices are extremely simple and economical to produce and easy to install.

Accordingly, it will be apparent that numerous changes and modifications may be made in the form, construction and arrangement of the elements employed in the combination. Therefore, it should be understood that the particular embodiments of the invention shown in the drawings and described above are intended to be illustrative only and are not intended to limit the scope of the invention.

I claim:

1. A liquid filter and chip detector for use in a liquid circulating system comprising a casing having an inlet and an outlet, a filter screen located in the casing between the inlet and outlet and inclined at an angle with respect to the path of flow of liquid through the casing, spaced electrical contacts located on the inlet side of the filter screen adjacent that portion of the filter screen farthest removed from the inlet, and an electrical circuit including said contacts, said contacts having a gap therebetween, said gap having means for completing said circuit by a bridging accumulation of electrically conducting material between said contacts.

2. A liquid filter and chip detector as defined in claim 1 wherein the filter screen is conical in shape and positioned with the apex thereof farthest removed from said inlet, and said electrical contacts are positioned adjacent the apex of the conical filter screen.

3. A liquid filter and chip detector as defined in claim 1 wherein a magnetic element is located adjacent the electrical contacts.

4. A liquid filter and chip detector as defined in claim 1 wherein the filter screen is formed of electrically conducting material and forms a part of said electrical circuit.

5. A liquid filter and chip detector adapted for use in a liquid circulating system comprising a casing having an inlet and an outlet, a metallic filter screen located in said casing and inclined with respect to the path of flow of liquid from said inlet to said outlet, a contact element located on the inlet side of said filter screen adjacent the portion of the screen farthest removed from said inlet, said contact element being spaced and electrically insulated from the screen, and an electrical circuit including the contact element and screen, said space between said contact element and said screen having means to complete said circuit by an accumulation of electrically conducting material bridging the space between said contact element and screen.

6. A liquid filter and chip detector as defined in claim 5 wherein the filter screen is conical in shape and the contact element is located adjacent the apex of the cone.

7. A liquid filter and chip detector for use in a liquid circulating system comprising a casing having an inlet and an outlet, a shoulder on said casing surrounding said inlet, a filter screen in the form of a cone positioned in the casing with the portion of the screen adjacent the base of the cone engaging the shoulder on the casing and surrounding the inlet, the apex of the conical filter screen being spaced from said shoulder, spaced electrical contacts carried by the filter screen and located on the inlet side of the screen near the apex thereof, and an electrical circuit including said contacts, said space between said contacts having means to complete said circuit by a bridging accumulation of electrically conducting material bridging the space between said contacts.

8. A liquid filter and chip detector as defined in claim 7 wherein said casing has an opening therein through which said screen is removable and a closure plate removably positioned in said opening.

References Cited by the Examiner

UNITED STATES PATENTS

| | | | |
|---|---|---|---|
| 2,252,222 | 8/1941 | Van Os. | |
| 2,349,992 | 5/1944 | Schrader | 210—85 X |
| 2,450,630 | 10/1948 | Bourne. | |
| 2,462,715 | 2/1949 | Booth | 210—222 X |
| 2,936,890 | 5/1960 | Botstiber | 210—85 X |

REUBEN FRIEDMAN, *Primary Examiner.*

D. M. RIESS, *Assistant Examiner.*